United States Patent
Ko et al.

(10) Patent No.: US 10,033,073 B2
(45) Date of Patent: Jul. 24, 2018

(54) METAL AIR BATTERY HAVING THERMAL MANAGEMENT STRUCTURE

(71) Applicant: Samsung Electronics Co., Ltd., Suwon-si, Gyeonggi-do (KR)

(72) Inventors: Jeongsik Ko, Seongnam-si (KR); Hyukjae Kwon, Suwon-si (KR); Dongmin Im, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 258 days.

(21) Appl. No.: 15/152,914

(22) Filed: May 12, 2016

(65) Prior Publication Data
US 2017/0062888 A1   Mar. 2, 2017

(30) Foreign Application Priority Data
Aug. 26, 2015  (KR) .................. 10-2015-0120549

(51) Int. Cl.
| | |
|---|---|
| *H01M 12/08* | (2006.01) |
| *H01M 8/04014* | (2016.01) |
| *H01M 8/22* | (2006.01) |
| *H01M 12/02* | (2006.01) |
| *H01M 8/04089* | (2016.01) |

(Continued)

(52) U.S. Cl.
CPC ....... *H01M 12/08* (2013.01); *H01M 8/04014* (2013.01); *H01M 8/04089* (2013.01); *H01M 8/04201* (2013.01); *H01M 8/04708* (2013.01); *H01M 8/22* (2013.01); *H01M 10/6565* (2015.04); *H01M 12/02* (2013.01); *H01M 8/04067* (2013.01); *H01M 8/04335* (2013.01);

(Continued)

(58) Field of Classification Search
CPC ......... H01M 10/6565; H01M 10/6566; H01M 12/02; H01M 12/08; H01M 8/04014; H01M 8/04067; H01M 8/04089; H01M 8/04201; H01M 8/04335; H01M 8/04708; H01M 8/22
See application file for complete search history.

(56) References Cited

U.S. PATENT DOCUMENTS

| | | |
|---|---|---|
| 5,560,999 A | 10/1996 | Pedicini et al. |
| 6,153,328 A | 11/2000 | Colborn |

(Continued)

FOREIGN PATENT DOCUMENTS

| | | |
|---|---|---|
| EP | 0649570 | 2/1999 |
| JP | 2014-137958 A | 7/2014 |

(Continued)

OTHER PUBLICATIONS

European Search Report for European Patent Application No. 16184293.5 dated Jan. 19, 2017.

*Primary Examiner* — Carlos Barcena
(74) *Attorney, Agent, or Firm* — Cantor Colburn LLP

(57) ABSTRACT

A metal air battery includes: a battery module comprising a metal air cell configured to use oxygen as a positive electrode active material; an air channel unit including a fluid tube extending from a side of a cathode layer of the metal air cell to a side of a metal anode layer of the metal air cell; and an air supply unit configured to supply air to the air channel unit, wherein the fluid tube is configured to direct air from the side of the cathode layer of the metal air cell to the side of the metal anode layer of the metal air cell.

27 Claims, 12 Drawing Sheets

(51) Int. Cl.
*H01M 8/04082* (2016.01)
*H01M 8/04701* (2016.01)
*H01M 10/6565* (2014.01)
H01M 8/04007 (2016.01)
H01M 8/0432 (2016.01)
H01M 10/6566 (2014.01)

(52) U.S. Cl.
CPC ........ *H01M 10/6566* (2015.04); *Y02E 60/128* (2013.01)

(56) References Cited

U.S. PATENT DOCUMENTS

| | | |
|---|---|---|
| 8,088,519 B2 | 1/2012 | Kelsey et al. |
| 2002/0061427 A1* | 5/2002 | Vu ..................... H01M 6/5038 429/406 |
| 2003/0017376 A1 | 1/2003 | Tsai et al. |
| 2004/0048146 A1 | 3/2004 | Adamson et al. |
| 2013/0115531 A1 | 5/2013 | Amendola et al. |
| 2015/0024286 A1 | 1/2015 | Duncan et al. |
| 2015/0372297 A1 | 12/2015 | Kameyama et al. |

FOREIGN PATENT DOCUMENTS

| | | |
|---|---|---|
| JP | 2014-225344 A | 12/2014 |
| KR | 1020130093094 A | 8/2013 |
| WO | 9402966 A2 | 2/1994 |
| WO | 9402966 A3 | 2/1994 |

\* cited by examiner

METAL AIR BATTERY HAVING THERMAL MANAGEMENT STRUCTURE

CROSS-REFERENCE TO RELATED APPLICATION

This application claims priority to and the benefit of Korean Patent Application No. 10-2015-0120549, filed on Aug. 26, 2015, in the Korean Intellectual Property Office, and all the benefits accruing therefrom under 35 U.S.C. § 119, the content of which is incorporated herein in its entirety by reference.

BACKGROUND

1. Field

The present disclosure relates to metal air batteries.

2. Description of the Related Art

A metal air battery includes a plurality of metal air cells, and each of the metal air cells includes an anode that adsorbs and emits ions and a cathode that uses the oxygen present in air as an active material. A reduction/oxidation reaction of oxygen introduced from outside of the metal air cell occurs at the cathode, and an oxidation/reduction reaction of a metal occurs at the anode. The metal air battery converts chemical energy generated by the oxidation/reduction reaction into electrical energy and outputs the electrical energy. For example, the metal air battery absorbs oxygen during discharging and emits oxygen during charging. Since the metal air battery uses the oxygen in air, an energy density of the metal air battery may be significantly improved. For example, the metal air battery may have an energy density that is several times greater than an energy density of an existing lithium ion battery.

In addition, since the metal air battery has a low possibility of ignition caused by an abnormally high temperature, the metal air battery has excellent stability. Also, since the metal air battery can operate through absorption and emission of oxygen without the use of heavy metals, the metal air battery is less likely to cause environmental pollution. Therefore, much research has been conducted into metal air batteries. Nonetheless, an improved metal air battery is needed.

SUMMARY

Additional aspects will be set forth in part in the description which follows and, in part, will be apparent from the description, or may be learned by practice of the presented exemplary embodiments.

According to an aspect, a metal air battery includes: a battery module including a metal air cell configured to use oxygen as a positive electrode active material; an air channel unit including a fluid tube extending from a side of a cathode layer of the metal air cell to a side of a metal anode layer of the metal air cell; and an air supply unit configured to supply air to the air channel unit, wherein the fluid tube is configured to direct air from the side of the cathode layer of the metal air cell to the side of the metal anode layer of the metal air cell.

The battery module may include 1 to 1000 metal air cells.

The battery module may include a first metal air cell and a second metal air cell, which are adjacent to each other, and wherein the air channel unit may include a first fluid tube disposed on the first metal air cell and a second fluid tube disposed on the second metal air cell, and wherein each of the first fluid tube and the second fluid tube includes an air inflow unit configured for air inflow and an air outflow unit configured for air outflow.

The air inflow unit of the first fluid tube and the air inflow unit of the second fluid tube may be disposed between the first metal air cell and the second metal air cell.

The first tube and the second fluid tube may share a single air inflow unit.

The air outflow unit of the first fluid tube and the air outflow unit of the second fluid tube may be disposed on opposite surfaces of the first metal air cell and the second metal air cell, respectively.

An area of the air inflow unit shared by the first fluid tube and the second fluid tube may be greater than an area of the air outflow unit of each of the first fluid tube and the second fluid tube.

The air inflow unit of the first fluid tube may be disposed adjacent to the side of the cathode layer of the first metal air cell, and the air inflow unit of the second fluid tube may be disposed adjacent to the side of the cathode layer of the second metal air cell, and the air outflow unit of the first fluid tube may be disposed adjacent to the side of the metal anode layer of the first metal air cell and the second fluid tube may be disposed adjacent to the side of the metal anode layer of the second metal air cell.

The metal air battery may further include a manifold disposed between the air supply unit and the air channel unit, wherein the manifold is configured to uniformly distribute air from the air supply unit to the fluid tube.

The metal air battery may further include temperature sensor configured to measure an air temperature inside the fluid tube.

The air supply unit may include a temperature adjustment unit, wherein the temperature adjustment unit is configured to adjust a temperature of the air supplied to the air channel unit.

The metal air battery may further include a control unit configured to control the temperature adjustment unit based on the air temperature inside the fluid tube.

The air supply unit may further include an air suction unit configured to suction air from outside of the air supply unit and a moisture removal unit configured to remove moisture from the suctioned air.

The metal air battery may further include a heat exchange structure disposed on the side of the cathode layer or on the side of the metal anode layer of the metal air cell.

The heat exchange structure may include a concave-convex structure disposed on a surface of the cathode layer or the metal anode layer of the at least one metal air cell.

The heat exchange structure may include a plurality of flat plates which protrude in a perpendicular direction from the surface of the cathode layer or the surface of the metal anode layer.

The metal air cell may further include: a metal anode layer; an electrolyte film disposed on the metal anode layer; and a cathode layer disposed on the electrolyte film and configured to use oxygen as an active material.

The fluid tube may include an air inflow unit configured for air inflow and an air outflow unit configured for air outflow, wherein the air inflow unit and the air outflow unit are disposed adjacent to the cathode layer and the metal anode layer of the metal air cell, respectively.

A plurality of fluid tubes may be arranged with respect to a single metal air cell.

The plurality of fluid tubes may be disposed at regular intervals along surfaces of the metal anode layer and the cathode layer.

The at least one metal air cell may have a three dimensional structure which may include: at least one cathode layer; an electrolyte film, which includes a bend to surround a lower surface, a first side surface, and an upper surface of the at least one cathode layer; and a metal anode layer, which includes a bend to surround a lower surface, a first side surface, and an upper surface of the electrolyte film, wherein the electrolyte film and the metal anode layer are arranged such that a second side surface of the at least one cathode layer is exposed to an outside of the metal air cell, and wherein the second side surface is arranged opposite to the first side surface of the cathode layer.

The metal air cell may include a plurality of cathode layers, wherein each electrolyte film and each metal anode layer includes a bend to surround a corresponding cathode layer of the plurality of cathode layers.

Each fluid tube may be disposed on a corresponding cathode layer of the plurality of cathode layers, respectively.

Each of the fluid tubes may extend from the second side surface of each of the plurality of cathode layers to the metal anode layer to surround at least a portion of the metal air cell.

Each of the fluid tubes may include an air inflow unit configured for air inflow and an air outflow unit configured for air outflow, wherein the air inflow unit and the air outflow unit of each of the fluid tubes includes an opening which faces a third side surface of each of the plurality of cathode layers, and the third side surface is between the first side surface and the second side surface of each of the plurality of cathode layers.

A portion of each of the fluid tubes may surround a fourth side surface of each of the plurality of cathode layers, and the fourth side surface is opposite to the third side surface of each of the plurality of cathode layers.

According to another aspect, a method of controlling temperature of the metal air battery includes: operating the battery module; supplying air from the air supply unit to the air channel unit; directing air through the fluid tube of the air channel unit from the side of the cathode layer of the metal air cell to the side of the metal anode layer of the metal air cell such that air flows across a surface of the cathode layer and across a surface of the anode layer, wherein the fluid tube comprises an air inflow unit through which the air flows into the air channel unit and an air outflow unit through which the air flows out of the air channel unit; and cooling the cathode layer and heating the metal anode layer simultaneously to control the temperature of the metal air battery.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
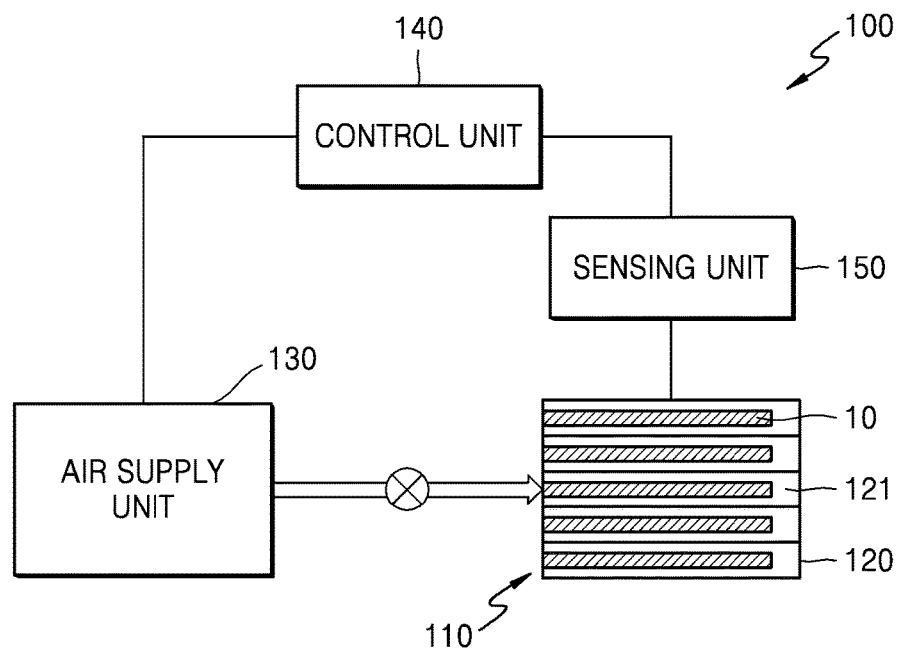
FIG. 1 is a block diagram of a metal air battery according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present inventive concept.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/ or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a metal air battery having a thermal management structure will be described with reference to the accompanying drawings. Like reference numerals refer to like elements throughout the drawings. In the drawings, the dimensions of the elements may be exaggerated for clarity and convenience. In addition, the following exemplary embodiments are merely exemplary, and various modifications may be made therefrom.

FIG. 1 is a block diagram of a metal air battery 100 according to an exemplary embodiment. Referring to FIG. 1, the metal air battery 100 may include a battery module 110 including a metal air cell 10 that is configured to use oxygen present in ambient air as a positive electrode active material, an air channel unit 120 including a fluid tube 121 that extends from a side of a cathode of the metal air cell 10 to a side of an anode thereof to surround at least a portion of the metal air cell 10, and an air supply unit 130 configured to supply air to the air channel unit 120. In addition, the metal air battery 100 may further include a control unit 140 configured to control an operation of the air supply unit 130 and a sensing unit 150 including a plurality of sensors.

The metal air cell 10 in the battery module 110 may be configured to generate electricity based on oxidation of a metal and reduction of oxygen. For example, during discharging, when a metal is lithium (Li), the metal air cell 10 may generate electricity through an oxidation reaction in which lithium (Li) reacts with oxygen to generate lithium peroxide ($Li_2O_2$). Meanwhile during charging, a reduction reaction occurs in which lithium (Li) may be reduced from lithium peroxide and oxygen may be generated. Various metals may be used in addition to, or as an alternative to, lithium (Li), and a reaction principal thereof may be substantially the same as lithium (Li). For example, the battery module 110 may include at least one selected from a sodium (Na) air cell, a zinc (Zn) air cell, a potassium (K) air cell, a calcium (Ca) air cell, a magnesium (Mg) air cell, an iron (Fe) air cell, an aluminum (Al) air cell, and an alloy air cell including two or more of Na, Zn, K, Ca, Mg, and Fe.

During discharging of metal air cell 10, heat may be generated as metal ions react with oxygen at the cathode. In addition, when an electrical current is flowing, additional heat may be generated due to a resistance component. When a temperature of the cathode is raised due to the generated heat, decomposition of an electrolyte, corrosion of an electrode, and negative reactivity may occur in the metal air cell 10. In order to prevent the decomposition of the electrolyte, the corrosion of the electrode, and the negative reactivity, the cathode of the metal air cell 10 may be cooled.

Figure 2:
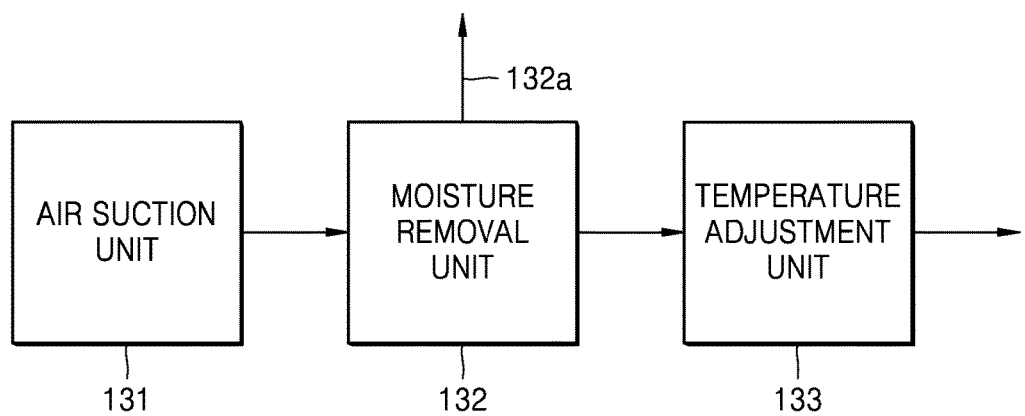
FIG. 2 is a block diagram of an air supply unit of the metal air battery illustrated in FIG. 1.

The cooling of the cathode of the metal air cell 10 may be performed by adjusting a temperature of air supplied to the metal air cell 10 by the air supply unit 130. For example, FIG. 2 is a block diagram of the air supply unit 130 of the metal air battery 100 illustrated in FIG. 1. Referring to FIG. 2, the air supply unit 130 may include an air suction unit 131 configured to suction air from outside of the air supply unit, a moisture removal unit 132 configured to remove moisture from the suctioned air, and a temperature adjustment unit 133 configured to adjust a temperature of the moisture-removed air. The air suction unit 131 may be configured to adjust an air suction amount under control of the control unit 140. The temperature adjustment unit 133 is illustrated in FIG. 2 as being positioned at the rear of the moisture removal unit 132 along an air flow direction, but the placement order of the moisture removal unit 132 and the temperature adjustment unit 133 may be changed.

The moisture removal unit 132 may be configured to remove moisture and impurities from the air, which is suctioned from outside of the air suction unit 131. When moisture is present in the air, lithium hydroxide may be generated during discharging of the metal air cells 10, and accordingly, the energy density of the metal air battery 100 may be reduced and a battery life thereof may be shortened. In this regard, the moisture removal unit 132 may be alternatively referred to as an air drier. Although not illustrated in detail, the moisture removal unit 132 may include, for example, an adsorption unit configured to adsorb moisture present in the air and a heating unit configured to heat the adsorption unit and desorb the moisture adsorbed by the adsorption unit. The moisture desorbed from the adsorption unit may be exhausted outside of the moisture removal unit through a moisture outlet port 132a. The moisture removal unit 132 may also remove nitrogen and other impurities from the air in addition to moisture in order to increase the oxygen concentration in air supplied to the air channel unit 120.

Air dried by the moisture removal unit 132 may be supplied to the temperature adjustment unit 133. The temperature adjustment unit 133 may lower a temperature of the air supplied to the air channel unit 120 under control of the control unit 140. For example, the temperature of the air supplied to the air channel unit 120 may be maintained at room temperature. However, when the cathode of the metal air cell 10 is excessively heated, the control unit 140 may be used to signal the temperature adjustment unit 133 to further lower the temperature of the air supplied to the air channel unit 120. To this end, the sensing unit 150 may include a temperature sensor configured to measure an air temperature inside the fluid tube 121 of the air channel unit 120. The control unit 140 may be configured to control the temperature adjustment unit 133 so as to adjust the temperature of the air supplied to the air channel unit 120 based on the air temperature inside the fluid tube 121. However, in a normal environment, since the cathode of each of the metal air cells 10 may be cooled using air at room temperature, the control unit 140 may stop operation of the temperature adjustment unit 133. When it is possible to lower the temperature of the air while the moisture removal unit 132 removes moisture, the temperature adjustment unit 133 may be integrated with the moisture removal unit 132.

During repeated charging/discharging of the metal air cells 10, a dendrite may grow little by little on a surface of an anode, and accordingly, the anode and an electrolyte may be damaged. The growth of the dendrite on the anode can be inhibited at high temperatures. Therefore, when the anode of each of the metal air cells 10 is heated while the cathode thereof is cooled, the stability of the metal air cells 10 may be improved, and the battery life may be increased. The metal air battery 100 may have a heat management structure capable of cooling the cathode of each of the metal air cells 10 while simultaneously heating the anode thereof.

Figure 3:
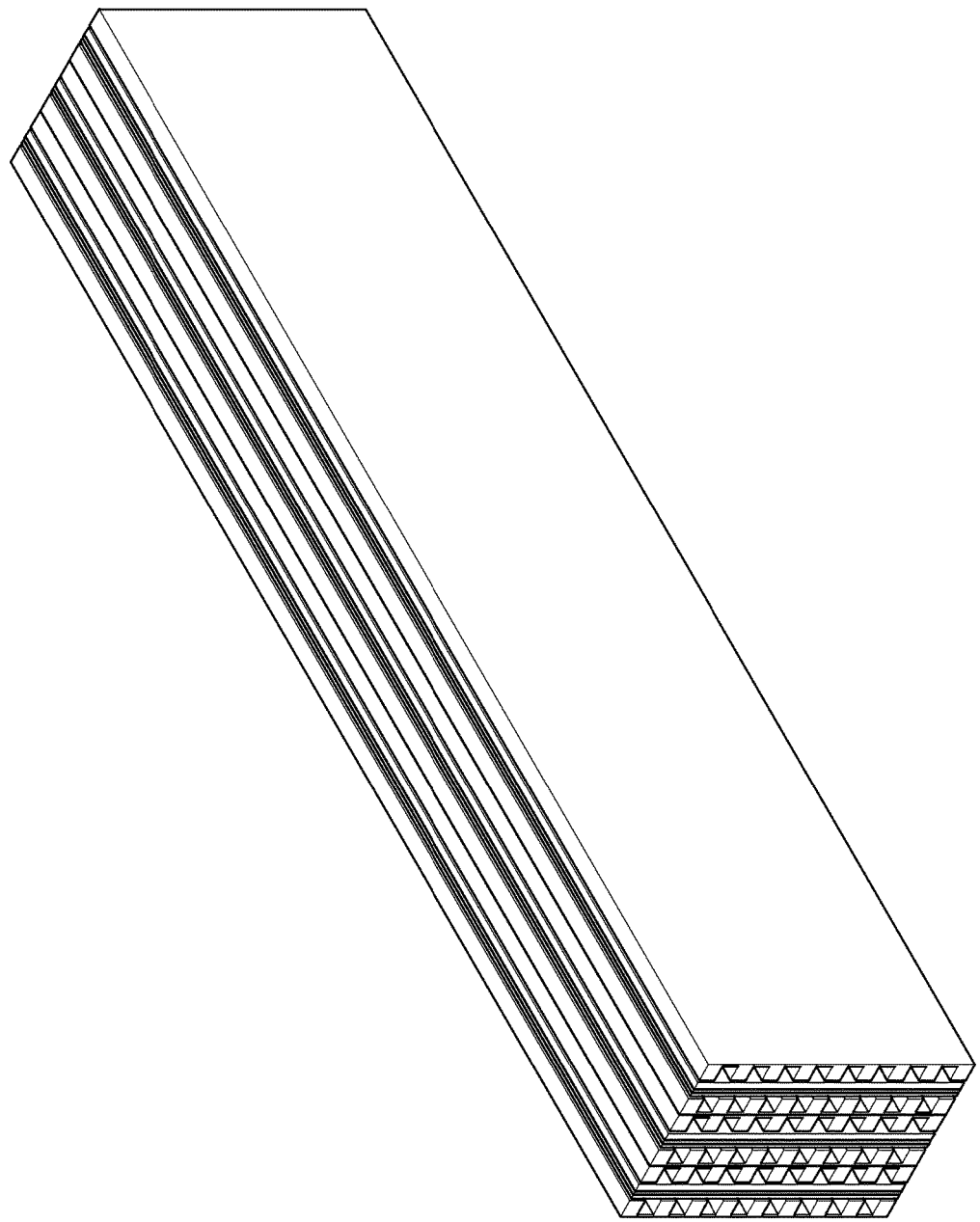
FIG. 3 is a perspective view of a battery module and an air channel unit of a metal air battery, according to an exemplary embodiment.

For example, FIG. 3 is a perspective view of a battery module 110 and an air channel unit 120 of a metal air battery 100, according to an exemplary embodiment. In addition, FIG. 4 is a cross-sectional view of the battery module 110 and the air channel unit 120 illustrated in FIG. 3, and FIG. 5 is a front view of the battery module 110 and the air channel unit 120 illustrated in FIG. 3.

Figure 4:
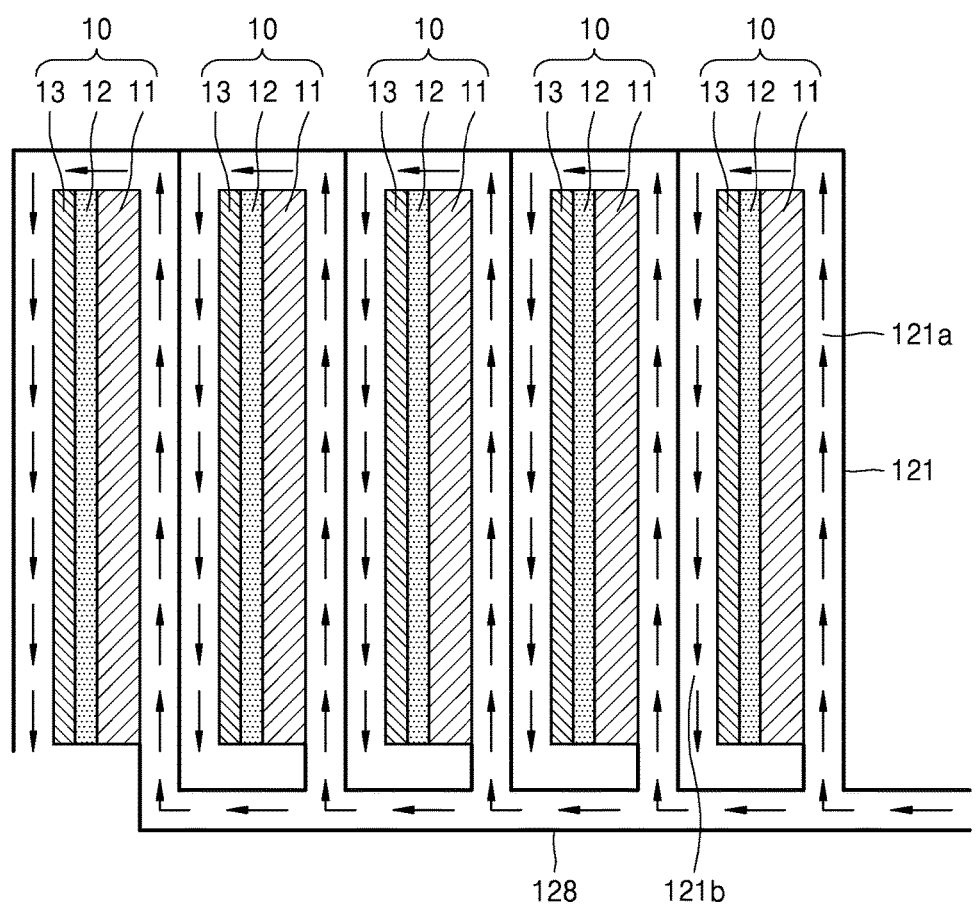
FIG. 4 is a cross-sectional view of the battery module and the air channel unit illustrated in FIG. 3.
Figure 5:
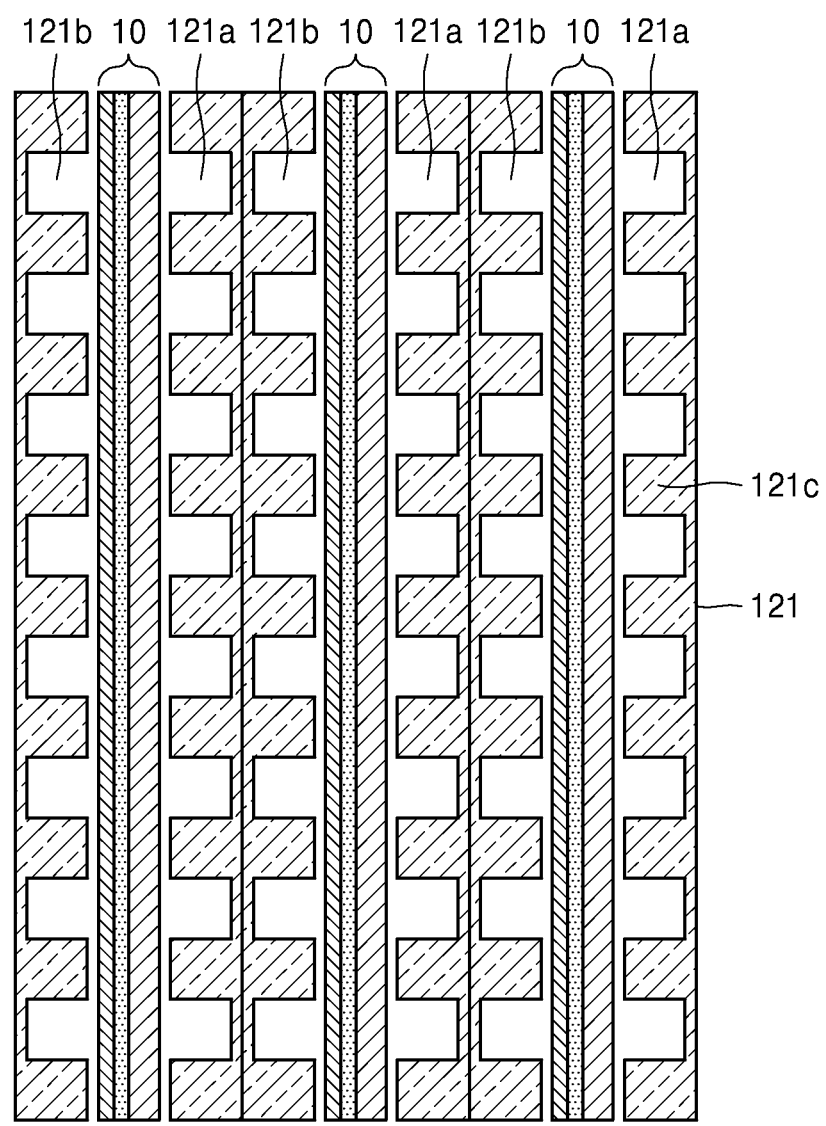
FIG. 5 is a front view of the battery module and the air channel unit illustrated in FIG. 3.

Referring to FIG. 4, the battery module 110 may include a plurality of metal air cells 10 that are arranged in parallel to each other. The number of metal air cells 10 in the battery module is not limited, and the battery module 110 may include, for example, from 1 to 1000 metal air cells, or 2 to 500 metal air cells, or 4 to 250 metal air cells. Each of the metal air cells 10 may include a metal anode layer 13, an electrolyte film 12 on one side surface of the metal anode layer 13, and a cathode layer 11 on one side surface of the electrolyte film 12. The cathode layer 11 is configured to use oxygen as an active material. The metal anode layer 13 may function to adsorb and emit metal ions and may include, for example, one selected from lithium (Li), sodium (Na), zinc (Zn), potassium (K), calcium (Ca), magnesium (Mg), iron (Fe), and aluminum (Al), and an alloy thereof. The electrolyte film 12 may function to transfer metal ions to the cathode layer 11. To this end, the electrolyte film 12 may include an electrolyte prepared by dissolving a metallic salt in a solvent. The electrolyte may include at least one selected from a polymer-based electrolyte, an inorganic electrolyte, and a composite electrolyte prepared by mixing the polymer-based electrolyte and inorganic electrolyte. For example, the metallic salt may include a lithium salt such as $LiN(SO_2CF_2CF_3)_2$, $LiN(SO_2C_2F_5)_2$, $LiClO_4$, $LiBF_4$, $LiPF_6$, $LiSbF_6$, $LiAsF_6$, $LiCF_3SO_3$, $LiN(SO_2CF_3)_2$, $LiC(SO_2CF_3)_3$, $LiN(SO_3CF_3)_2$, $LiC_4F_9SO_3$, $LiAlCl_4$, or lithium bis(trifluoromethanesulfonyl)imide (LiTFSI), and may further include another metal salt such as $AlCl_3$, $MgCl_2$, NaCl, KCl, NaBr, KBr, or $CaCl_2$, in addition to the lithium salt. The solvent may include any suitable material capable of dissolving the lithium salt and the metallic salt. For example, the solvent may include at least one selected from a carbonate solvent, such as dimethylcarbonate (DMC), an ester solvent, such as methyl acetate, an ether solvent, such as dibutyl ether, a ketone solvent, such as cyclohexanone, an amine solvent, such as triethylamine, and a phosphine solvent, such as triethylphosphine.

In addition, the electrolyte film 12 may further include a separator that prevents transmission of oxygen and is ionically conductive. The separator may include a flexible polymer-based separator. For example, the separator may include a polymeric non-woven fabric such as a polypropylene non-woven fabric, or a polyphenylene sulfide non-woven fabric, or a porous film including an olefin-based resin such as polyethylene or polypropylene. The separator and the electrolyte may be respectively formed as separate layers, and the electrolyte film 12 may be formed as a single layer by impregnating an electrolyte in the pores of a porous separator. For example, the electrolyte film 12 may be formed by impregnating an electrolyte in the pores of the porous separator, the electrolyte being prepared by mixing polyethylene oxide (PEO) and LiTFSI.

A single layer is illustrated in FIG. 4 for convenience, but the cathode layer 11 may include a cathode material and a gas diffusion layer. The cathode material may be formed by mixing an electrolyte for conducting metal ions, a catalyst for oxidation/reduction of oxygen, a conductive material, a binder, and a solvent and drying the mixture. The electrolyte may include the lithium salt or the metal salt described above. The conductive material may include at least one selected from a porous carbon-based material, a conductive metallic material, and an organic material. For example, the porous carbon-based material may include at least one selected from carbon black, graphite, graphene, carbon, a carbon fiber, and a carbon nanotube. The conductive metallic material may be used in, for example, a metal powder form. The catalyst may include at least one selected from the platinum (Pt), gold (Au), and silver (Ag), and may include an oxide of at least one selected from manganese (Mn), nickel (Ni), and cobalt (Co). The binder may include, for example, at least one selected from polytetrafluoroethylene (PTFE), polypropylene, polyvinylidene fluoride (PVDF), polyethylene, and styrene-butadiene rubber.

The gas diffusion layer may function to absorb oxygen in the air and supply the absorbed oxygen to the cathode material. To this end, the gas diffusion layer may have a porous structure so as to smoothly diffuse oxygen to the outside. For example, the gas diffusion layer may include at least one selected from a carbon paper including a carbon fiber, a carbon cloth, a carbon felt, a sponge-like porous metal, and a metal fiber mat.

The air channel unit 120 may include at least one fluid tube 121 that extends from a side of the cathode layer 11 of each of the metal air cells 10 to a side of the metal anode layer 13 thereof to surround at least a portion of each of the metal air cells 10. Each of the fluid tubes 121 may include an air inflow unit 121*a* through which air flows in and an air outflow unit 121*b* through which air flows out. The air inflow unit 121*a* is configured for air inflow and may be disposed at a side of the cathode layer 11 of each of the metal air cells 10, and the air outflow unit 121*b* is configured for air outflow and may be disposed at a side of the metal anode layer 13 thereof. In addition, the metal air battery 100 may further include a supply manifold 128 disposed between the air supply unit 130 and the air channel unit 120. The supply manifold 128 may be connected to the air inflow unit 121*a* of each of the fluid tubes 121 and may be configured to uniformly distribute air from the air supply unit 130 to the fluid tubes 121.

As illustrated in FIG. 4, the fluid tube 121 may be configured such that air flows from the cathode layer 11 of each of the metal air battery cells 10 to the metal anode layer 13 thereof to perform a heat exchange. For example, air flowing in each of the fluid tubes 121 through the air inflow unit 121*a* may supply oxygen to the cathode layer 11 of each of the metal air cells 10 and may cool the cathode layer 11 thereof at the same time. For example, the temperature of the air supplied to each of the fluid tubes 121 may be room temperature, and the temperature of the cathode layer 11 of each of the metal air cells 10 may be in the range of about 60° C. to about 70° C. during discharging of the metal air cells 10. Therefore, air at room temperature may sufficiently cool the cathode layer 11. While the air exchanges heat with the cathode layer 11 to cool the cathode layer 11, the temperature of the air may be raised.

The heated air may flow along each of the fluid tubes 121 to flow toward the metal anode layer 13 of each metal air cell 10. To this end, an end of each of the metal air cells 10 may be spaced apart from an inner wall of the fluid tube 121. Therefore, the air may flow around the end of each of the metal air cell 10 and may reach the metal anode layer 13 of each of the metal air battery cells 10. The air, which has been heated by the cathode layer 11, may exchange heat with the metal anode layer 13 to heat the anode metal layer 13. For example, assuming that during discharging of the metal air cell 10, a current density is about 1.2 milliamperes per square centimeter (mA/cm$^2$), heat conductivity of the gas diffusion layer is about 1.5 watts per meter Kelvin (W/m-K), heat conductivity of the lithium electrode is about 84.8 W/m-K, heat conductivity of the electrolyte is about 0.17 W/m-K, and heat conductivity of air is about 0.02 W/m-K, when a temperature of air flowing in through the air inflow unit 121*a* is about 300 K (about 27° C.), a temperature of air flowing out through the air outflow unit 121*b* may be raised to the range of about 315 K (42° C.) to about 340 K (67° C.).

According to an exemplary embodiment, in each of the metal air cells 10, the cathode layer 11 of each of the metal air battery cells 10 may be cooled and the metal anode layer 13 may be heated at the same time. In particular, the air heated while cooling the cathode layer 11 may be supplied to the metal anode layer 13 to raise a temperature of the anode metal layer 13. As a result, a single heat management structure may be used to cool the cathode layer 11 while simultaneously inhibiting the formation of the dendrite at the metal anode layer 13. Therefore, an additional device such as a heater for heating the metal anode layer 13 may be omitted f, and the cooling of the cathode layer 11 and the heating of the metal anode layer 13 may be achieved at the same time by using a simple configuration, thereby improving a total energy density and an output of the metal air battery 100. In addition, due to the increase in temperature at the metal anode layer 13, the activity of ions around the metal anode layer 13 and metal ions of the metal anode layer 13 may also be improved, thereby improving efficiency of the metal air cells 10.

Furthermore, referring to FIG. 5, a plurality of fluid tubes 121 may be arranged with respect to a single metal air cell 10. For example, the plurality of fluid tubes 121 may be arranged at regular intervals in a height direction along surfaces of the metal anode layer 13 and the cathode layer 11. A barrier 121*c* may be positioned between the plurality of fluid tubes 121. A plurality of air inflow units 121*a* and a plurality of air outflow units 121*b* of the plurality of fluid tubes 121 may be separated by the barrier 121*c*. The air inflow unit 121*a* and the air outflow unit 121*b* of one fluid tube 121 may be positioned at the same height. Therefore, air supplied to a single fluid tube 121 may flow along surfaces of the cathode layer 11 and the metal anode layer 13 which are arranged at the same height. Each barrier 121*c* may be in direct contact with the surfaces of the metal anode layer 13 and the cathode layer 11, or alternatively, may be spaced a slight distance apart from the surfaces of the metal anode layer 13 and the cathode layer 11. When the barrier 121*c* is spaced apart from the surfaces of the metal anode layer 13 and the cathode layer 11, the plurality of air inflow units 121*a* and the plurality of air outflow units 121*b* may not be fully separated from one another, and thus air may be supplied to the surfaces of the metal anode layer 13 and the cathode layer 11 which are opposite to the barrier 121*c*, and thus, a heat exchange may occur.

Figure 6:
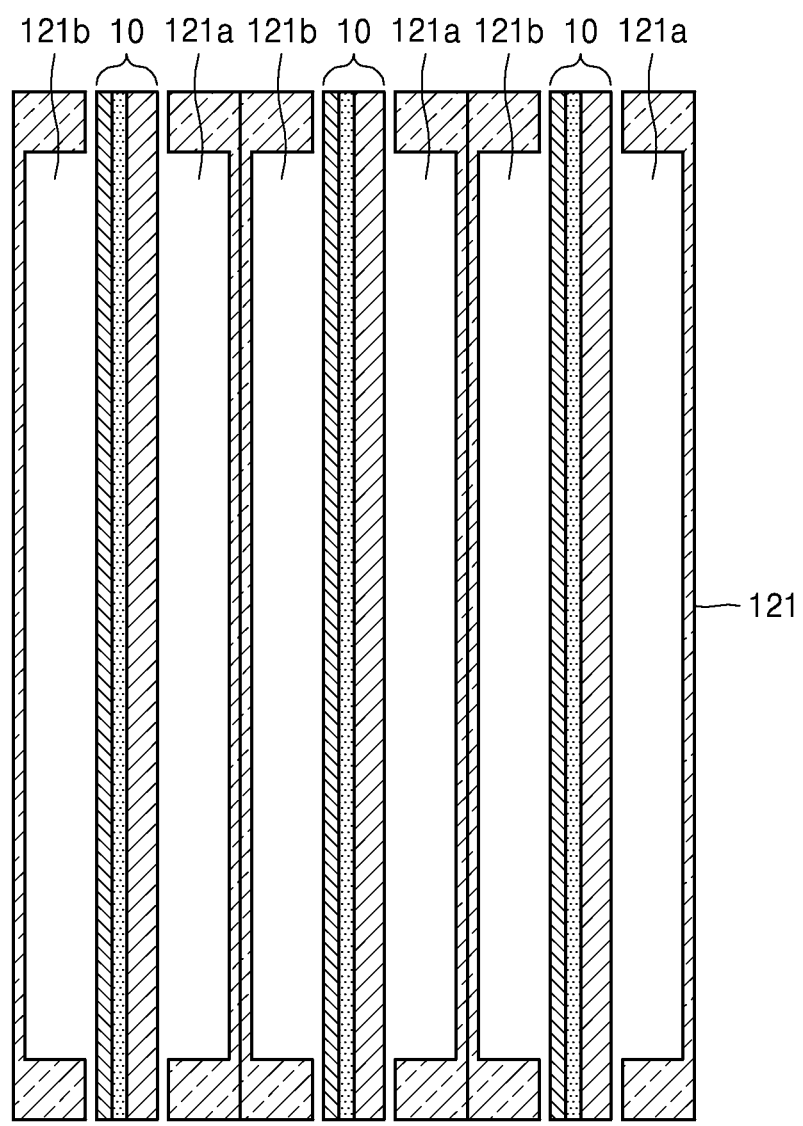
FIG. 6 is a front view of a battery module and an air channel unit according to another exemplary embodiment.

FIG. 6 is a front view of a battery module 110 and an air channel unit 120 according to another exemplary embodiment. Referring to FIG. 6, only one fluid tube 121 may be arranged with respect to a single metal air cell 10. In this case, the air channel unit 120 may not include the barrier 121*c* illustrated in FIG. 5. Accordingly, the entire surface of a cathode layer 11 and the entire surface of a metal anode layer 13 of each of the metal air cells 10 may be exposed to air inside one fluid tube 121. Since a lower end and an upper end of the metal air cell 10 respectively come into contact with a bottom surface and a ceiling surface of the fluid tube 121, the air inflow unit 121*a* and the air outflow unit 121*b* may be separated by each of the metal air cells 10. Therefore, air flowing in through the air inflow unit 121*a* may flow along the surface of the cathode layer 11 of the metal air battery cell 10 towards the air outflow unit 121*b* and flow out the air outflow unit 121*b* along the surface of the metal anode layer 13.

Figure 7:
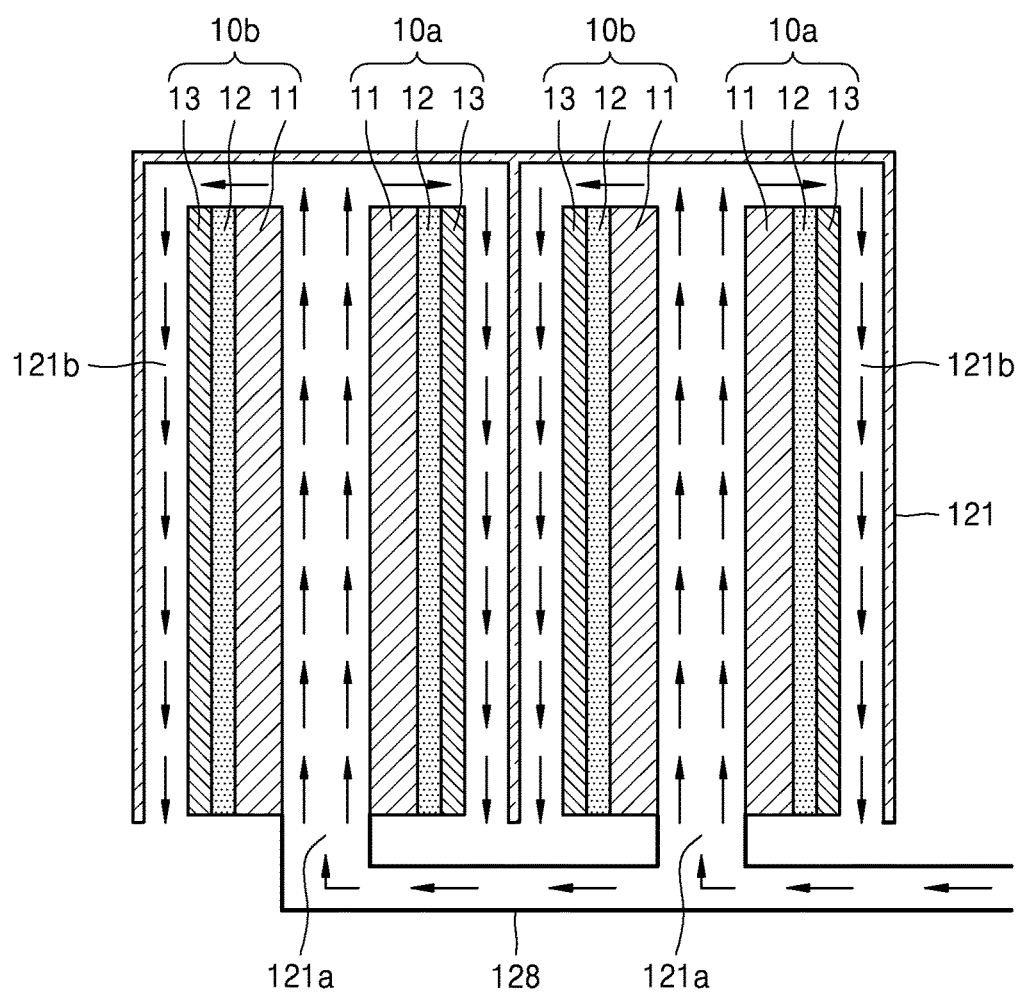
FIG. 7 is a cross-sectional view of a battery module and an air channel unit according to another exemplary embodiment.
Figure 8:
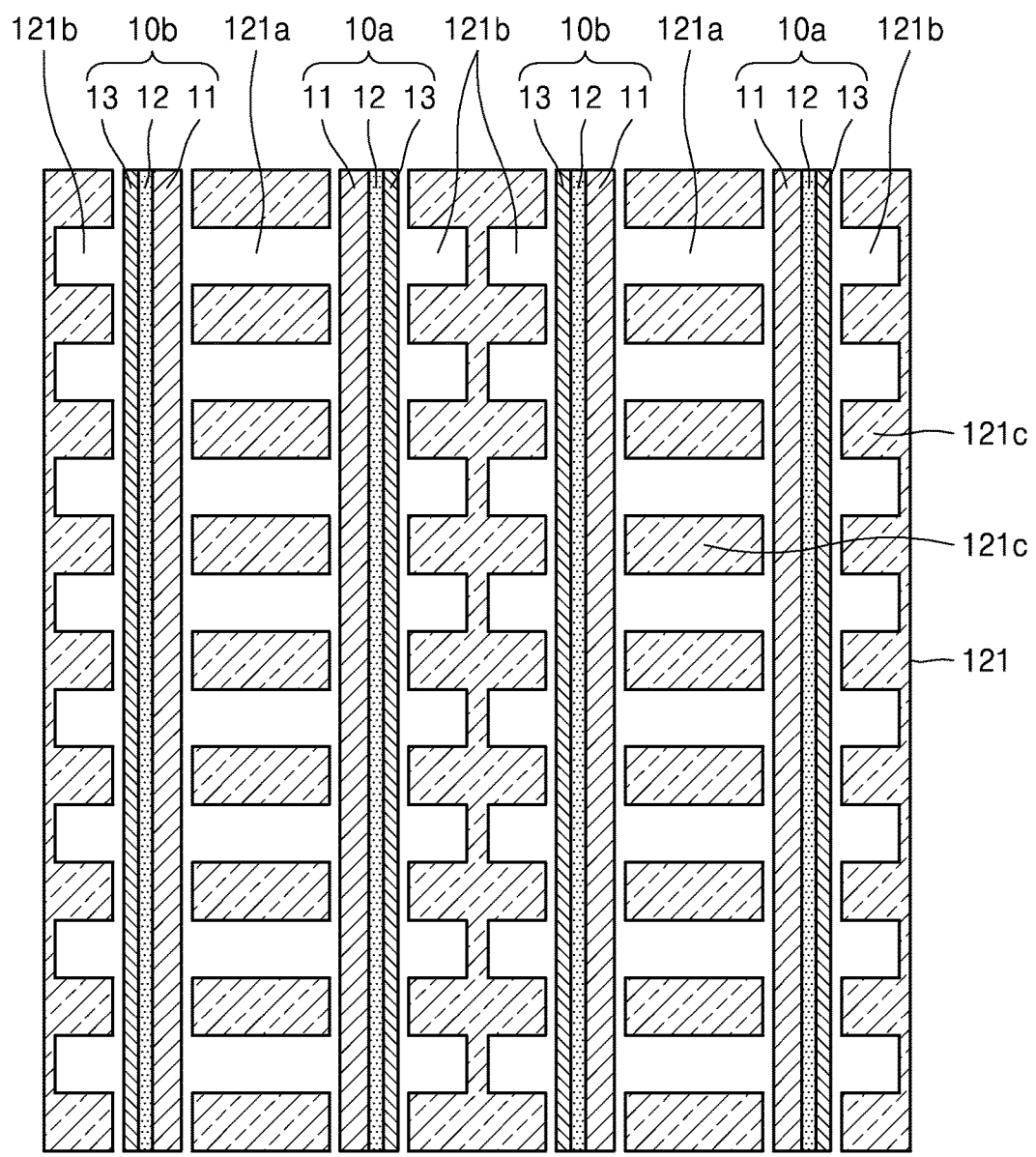
FIG. 8 is a front view of the battery module and the air channel unit illustrated in FIG. 7.

FIG. 7 is a cross-sectional view of a battery module 110 and an air channel unit 120 according to another exemplary embodiment. FIG. 8 is a front view of the battery module 110 and the air channel 120 unit illustrated in FIG. 7. In the embodiments illustrated in FIGS. 4 to 6, the air inflow unit 121*a* and the air outflow unit 121*b* of a single fluid tube 121 may be fully separated from the air inflow unit 121*a* and the air outflow unit 121*b* of another fluid tube 121. In the present exemplary embodiment, as illustrated in FIGS. 7 and 8, two adjacent fluid tubes 121 may share one air inflow unit 121*a*.

For example, referring to FIGS. 7 and 8, adjacent first and second metal air cells 10*a* and 10*b* may be arranged inside the fluid tubes 121, respectively. The air inflow unit 121*a* of the fluid tube 121 with respect to the first metal air cell 10*a* and the air inflow unit 121*a* of the fluid tube 121 with respect to the second metal air cell 10*b* may be disposed between the first metal air cell 10*a* and the second metal air cell 10*b*. In addition, there is no barrier positioned between the first metal air cell 10*a* and the second metal air cell 10*b* to separate the two adjacent fluid tubes 121. As a result, the fluid tube 121 with respect to the first metal air cell 10*a* and the fluid tube 121 with respect to the second metal air cell 10*b* may share one air inflow unit 121*a*. In this case, an area of the air inflow unit 121*a* shared by the two adjacent fluid tubes 121 may be greater than an area of the air outflow unit 121*b* of each of the two adjacent fluid tubes 121. For example, the area of the air inflow unit 121*a* shared by the two adjacent fluid tubes 121 may be twice the area of the air outflow unit 121*b* of each of the two adjacent fluid tubes 121.

In the present exemplary embodiment, the first and second metal air cells 10*a* and 10*b* may be disposed to be symmetrical to each other. For example, a cathode layer 11 of the first metal air cell 10*a* may be arranged at the left side of the first metal air cell 10*a* so as to face the air inflow unit 121*a*, and a cathode layer 11 of the second metal air cell 10*b* may be arranged at the right side of the second metal air cell 10*b* so as to face the air inflow unit 121*a*. In addition, a metal anode layer 13 of the first metal air cell 10*a* may be arranged at the right side of the first metal air cell 10*a*, and a metal anode layer 13 of the second metal air cell 10*b* may be arranged at the left side of the second metal air cell 10*b*. The air outflow units 121*b* of the two adjacent fluid tubes 121 may be arranged on opposite surfaces of the first and second metal air cells 10*a* and 10*b*, respectively. Therefore, the air inflow unit 121*a* shared by the two adjacent fluid tubes 121 may be disposed adjacent to the cathode layer 11 between the first metal air cell 10*a* and the second metal air cell 10*b*, and the air outflow units 121*b* may be respectively disposed adjacent to the metal anode layers 13 on the opposite surfaces of the first and second metal air cells 10*a* and 10*b*.

A plurality of fluid tubes 121 are illustrated in FIG. 8 as being positioned at regular intervals in a height direction with respect to the metal air cells 10, respectively, and a barrier 121*c* is illustrated in FIG. 8 as being positioned between the plurality of fluid tubes 121. However, the embodiment is not necessarily limited thereto. For example, as illustrated in FIG. 6, the entire surface of the cathode layer 11 and the entire surface of the metal anode layer 13 of each of the metal air cells 10 may be exposed to air inside one fluid tube 121.

Figure 9:
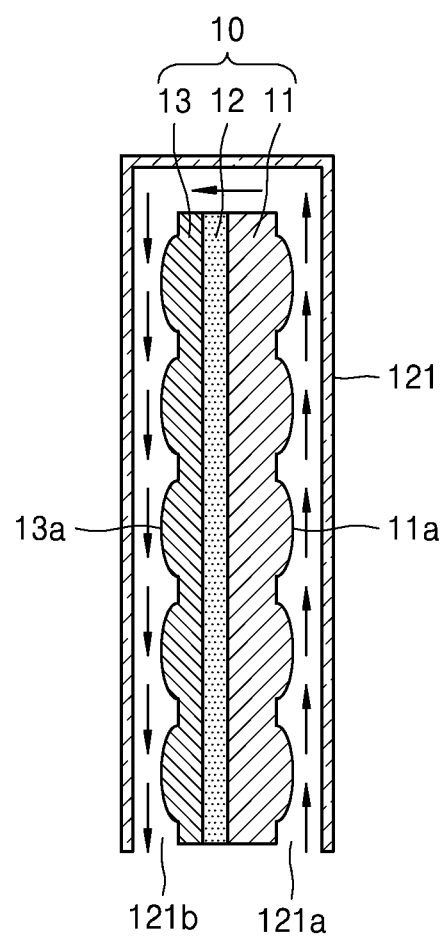
FIG. 9 is a cross-sectional view of a battery module and an air channel unit according to another exemplary embodiment.

FIG. 9 is a cross-sectional view of a battery module 110 and an air channel unit 120 according to another exemplary embodiment. As illustrated in FIG. 9, in order to further improve the efficiency of a heat exchange with air, a metal air battery 100 may further include a heat exchange structure positioned at a cathode layer 11 or a metal anode layer 13 of each of metal air cells 10. For example, as illustrated in FIG. 9, concave-convex structures 11*a* and 13*a* are illustrated in FIG. 9 as being formed on surfaces of the cathode layer 11 and the metal anode layer 13 as the heat exchange structure. The concave-convex structures 11*a* and 13*a* in FIG. 9 are formed on the entire surface of the cathode layer 11 and the entire surface of the metal anode layer 13, but are not limited thereto. Depending upon the desired heat exchange efficiency of each of the cathode layer 11 and the anode metal layer 13, the concave-convex structure 11*a* may be formed only on the surface of the cathode layer 11, or alternatively, the concave-convex structure 13*a* may be formed only on the surface of the metal anode layer 13.

Figure 10:
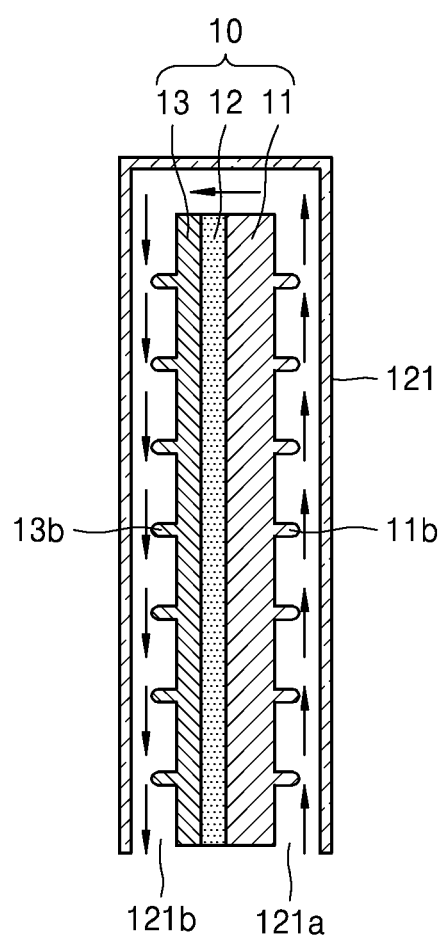
FIG. 10 is a cross-sectional view of a battery module and an air channel unit according to another exemplary embodiment.

FIG. 10 is a cross-sectional view of a battery module 110 and an air channel unit 120 according to another exemplary embodiment. As illustrated in FIG. 10, a heat exchange structure may include a plurality of flat plates 11*b* and 13*b* protruding in a perpendicular direction from surfaces of the cathode layer 11 and the metal anode layer 13 of each of metal air cells 10. For example, the plurality of flat plates 11*b* may protrude in a direction perpendicular to the surface of the cathode layer 11 so as to be disposed in parallel to one another on the surface of the cathode layer 11. Similarly, the plurality of flat plates 13*b* may protrude in a direction perpendicular to the surface of the metal anode layer 13 so as to be disposed in parallel to one another on the surface of the metal anode layer 13. Taking into consideration heat exchange efficiency desired for each of the cathode layer 11 and the metal anode layer 13, the plurality of flat plates 11*b* may be formed only on the surface of the cathode layer 11, or alternatively, the plurality of flat plates 13*b* may be formed only on the surface of the metal anode layer 13.

The air inflow unit 121*a* and the air outflow unit 121*b* of each of the plurality of fluid tubes 121 arranged in one metal air cell 10 have been described as being open to face a front surface of the air channel unit 120. However, according to the need, the inlet of the air inflow unit 121*a* and the outlet of the air outflow unit 121*b* may be positioned to face other surfaces rather than the front surface of the air channel unit 120. For example, FIG. 11 is a side view of a cathode side of a battery module 110 and an air channel unit 120 according to another exemplary embodiment, and FIG. 12 is a side view of an anode side of the battery module 110 and the air channel unit 120 according to yet another exemplary embodiment.

Figure 11:
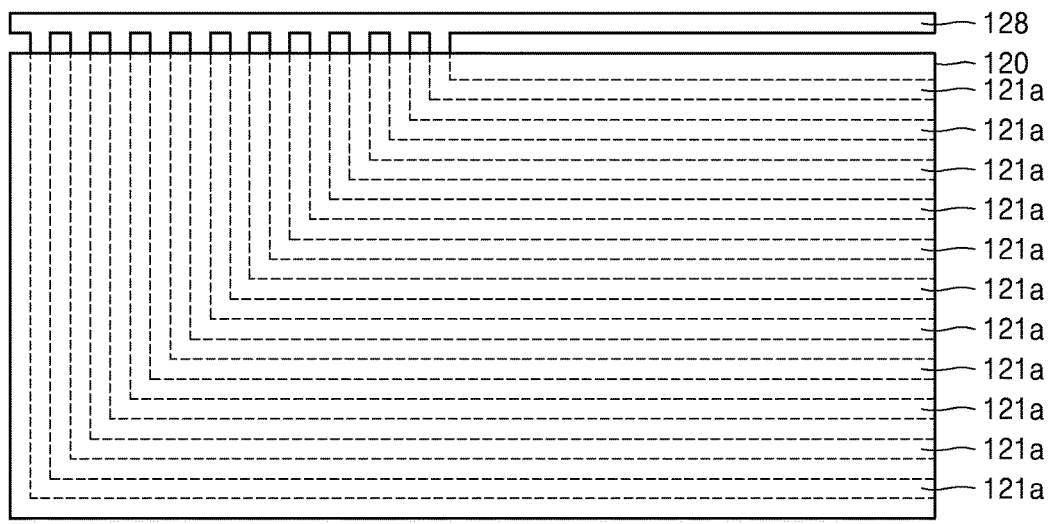
FIG. 11 is a side view of a cathode layer side of a battery module and an air channel unit according to another exemplary embodiment.

Referring to FIG. 11, inlets of air inflow units 121*a* adjacent to a cathode layer 11 (not shown in FIG. 11) of a metal air cell 10 may be arranged on an upper surface of the air channel unit 120. In this case, each of the air inflow units 121*a* may include a first portion extending in a perpendicular direction from the inlet on the upper surface of the air channel unit 120 and a second portion extending horizontally from the first portion. In addition, a supply manifold 128 may be disposed on the upper surface of the air channel unit 120 and be connected to each of the inlets of the air inflow units 121*a* to distribute air from an air supply unit 130 to a plurality of fluid tubes 121.

Figure 12:
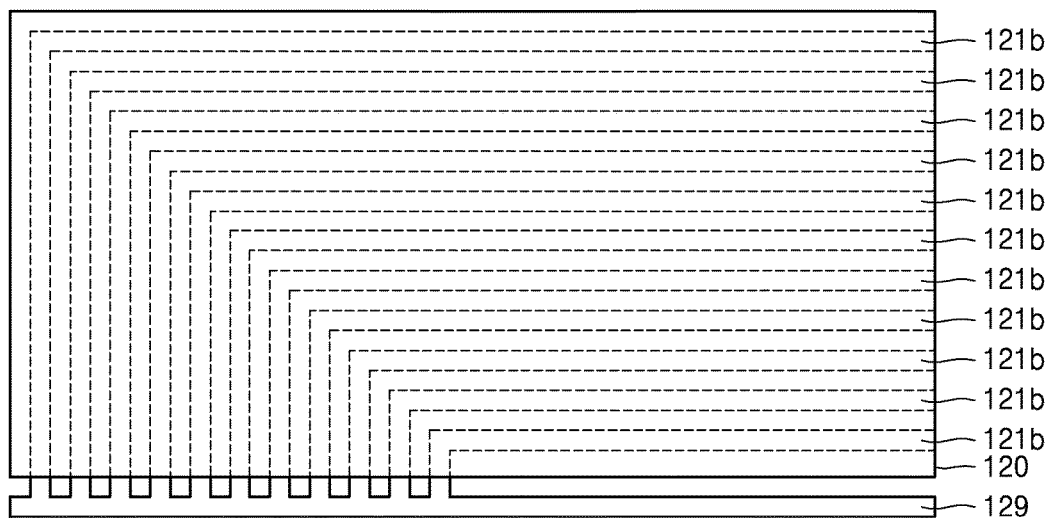
FIG. 12 is a side view of a metal anode layer side of the battery module and the air channel unit according to another exemplary embodiment.

Referring to FIG. 12, inlets of air outflow units 121*b* adjacent to a metal anode layer 13 (not shown in FIG. 12) of the metal air cell 10 may be positioned on a lower surface of the air channel unit 120. In this case, each of the air outflow units 121*b* may include a first portion extending in a perpendicular direction from the inlet on the lower surface of the air channel unit 120 and a second portion extending horizontally from the first portion. The second portion of the air inflow unit 121*a* and the second portion of the air outflow unit 121*b* may be positioned at the same height and may be connected to each other with respect to a single fluid tube 121. In addition, an outflow manifold 129 may be disposed on the lower surface of the air channel unit 120 and be connected to the inlets of the air outflow units 121*b* to collect air flowing out through a plurality of the air outflow units 121*b*.

The inlets of the air inflow units 121*a* and the outlets of the air outflow units 121*b* are illustrated in FIGS. 11 and 12 as being positioned on the upper surface and the lower surface of the air channel unit 120, respectively, but are not limited thereto. According to the need, the inlets of the air inflow units 121*a* and the outlets of the air outflow units 121*b* may be distributed on at least one of the front surface, the lower surface, or the upper surface of the air channel unit 120.

In the above-described embodiments, a metal air cell 10 having a two-dimensional structure has been described. That is, in the embodiments described above, the metal air cell 10 may have a structure in which the plate-shaped cathode 11, electrolyte film 12, and metal anode layer 13 are simply stacked. However, the metal air cell 10 is not limited to the two-dimensional structure and may instead have a three-dimensional structure so as to improve an efficiency of an oxygen supply and an energy density of the metal air battery 100.

Figure 13:
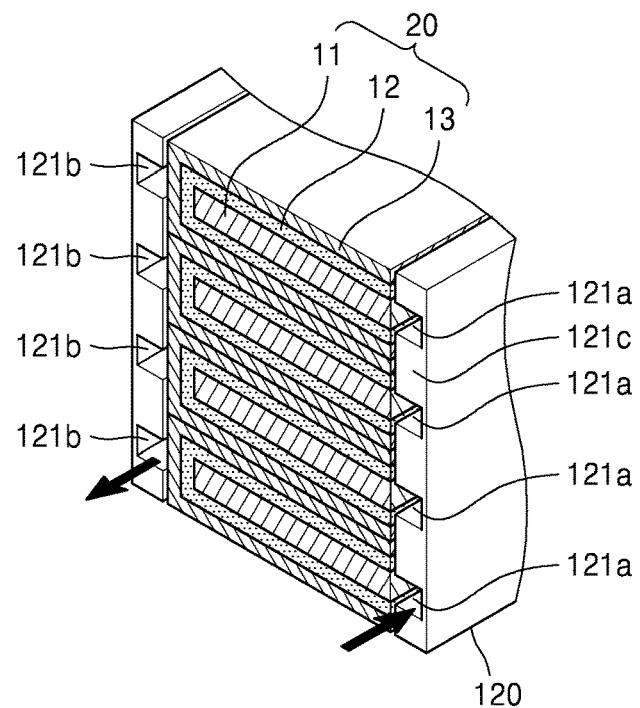
FIG. 13 is a perspective view of a battery module and an air channel unit of a metal air battery, according to another exemplary embodiment.

For example, FIG. 13 is a perspective view of a battery module 110 and an air channel unit 120 of a metal air battery 100, according to another exemplary embodiment. Referring to FIG. 13, each of the metal air cells 20 may include a cathode layer 11, an electrolyte film 12 which has been bent to surround a lower surface, a first side surface, and an upper surface of the cathode layer 11, and a metal anode layer 13 which has been bent to surround a lower surface, a first side surface, and an upper surface of the electrolyte film 12. The electrolyte film 12 and the metal anode layer 13 may be disposed such that a second side surface of the cathode layer 11 is exposed to the outside of the metal air cell 20, with the second side surface opposite to the first side surface of the cathode layer 11. In addition to the second side surface of the cathode layer 11, a third side surface and a fourth side surface of the cathode layer 11 between the first side surface and the second side surface may also be exposed to the outside of the metal air cell 20. For example, the electrolyte film 12 and the metal anode layer 13 are illustrated in FIG. 13 as having a bend to surround a left side surface of the cathode layer 11 such that a right side surface, a front surface, and a back surface of the cathode layer 11 are exposed to the outside. In other words, the electrolyte film 12 may be arranged to fully cover the left side surface, the lower surface, and the upper surface of the cathode layer 11, and the metal anode layer 13 may be disposed to fully cover the left side surface, the lower surface, and the upper surface of the electrolyte film 12. As illustrated in FIG. 13, a plurality of metal air cells 20 having such a structure may be stacked as a plurality of layers in a perpendicular direction.

Figure 14:
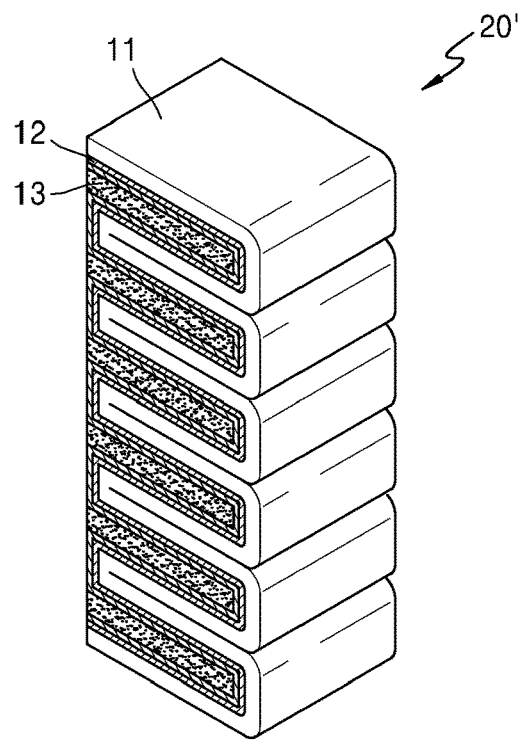
FIG. 14 is a perspective view of a metal air cell of a metal air battery, according to another exemplary embodiment.

FIG. 14 is a perspective view of a metal air cell 20' of a metal air battery 100, according to another exemplary embodiment. As illustrated in FIG. 14, the metal air cell 20' may include a plurality of cathode layers 11 arranged in parallel to each other in a perpendicular direction, a single electrolyte film 12, and a single metal anode layer 13. Each of the electrolyte film 12 and the metal anode layer 13 may be repeatedly bent in a meandering manner to surround each of the plurality of cathode layers 11. The metal air cell 20' may be used as an alternative to the stacked structure of the plurality of metal air cells 20 illustrated in FIG. 13.

Referring to FIG. 13 again, fluid tubes 121 may be disposed with respect to each of the cathode layers 11, respectively. Each of the fluid tubes 121 may extend horizontally from a second side surface (right side surface in FIG. 13) of the cathode layer 11 to the metal anode layer 13 to surround at least a portion of each of the metal air cells 20, with the second side surface being exposed to the outside of the metal air cell 20. For example, an air inflow unit 121*a* of each of the fluid tubes 121 may be arranged to face the second side surface of the cathode layer 11, which is exposed to the outside, and an air outflow unit 121*b* may be arranged to face the metal anode layer 13 surrounding the first side surface of the cathode layer 11 (left side surface in FIG. 13). In addition, as illustrated in FIG. 13, inlets of the air inflow unit 121*a* and outlets of the air outflow unit 121*b* may open to face the third side surface (front surface in FIG. 13) between the left side surface and the right side surface of the cathode layer 11. A portion of each of the fluid tubes 121 may be disposed to surround the fourth side surface (that is, the back surface) of the cathode layer 11, which is opposite to the front surface of the cathode layer 11. A barrier 121*c* is illustrated in FIG. 13 as positioned between the plurality of fluid tubes 121 that are arranged at different heights. However, the barrier 121*c* is optional and may be omitted.

Figure 15:
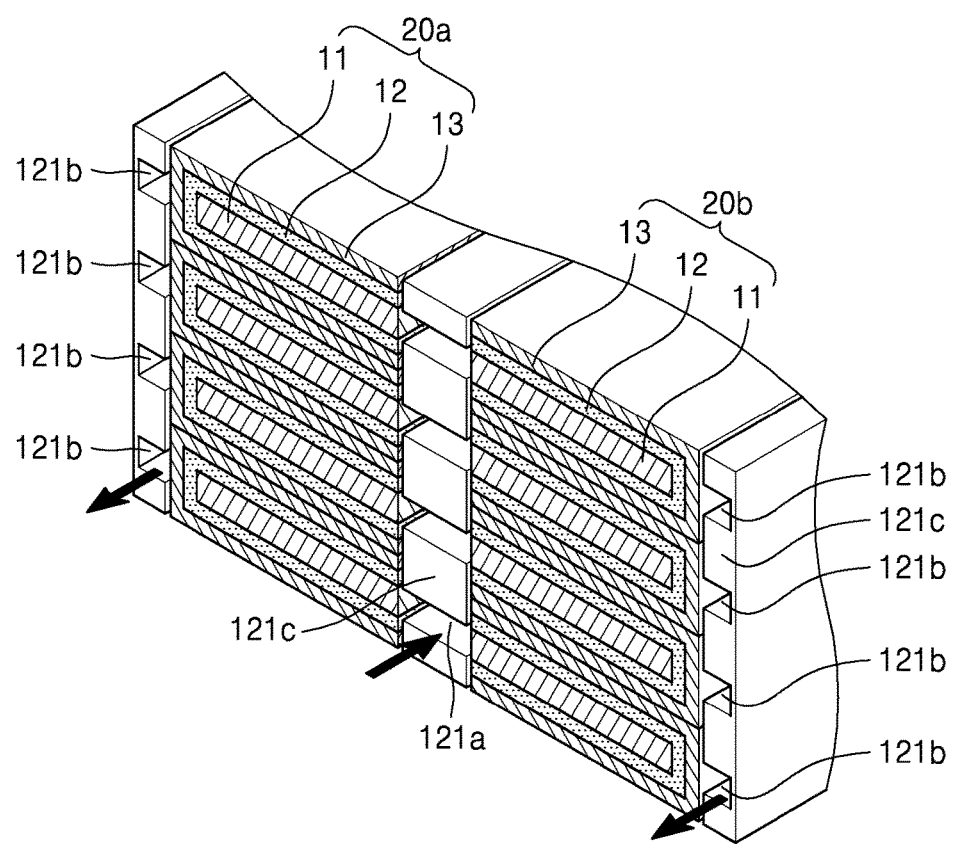
FIG. 15 is a perspective view of a battery module and an air channel unit of a metal air battery according to another exemplary embodiment.

FIG. 15 is a perspective view of a battery module 110 and an air channel unit 120 of a metal air battery 100, according to another exemplary embodiment. As illustrated in FIG. 15, two adjacent fluid tubes 121 may share one air inflow unit 121*a*. For example, the air inflow unit 121*a* shared by the two adjacent fluid tubes 121 may be positioned between a first metal air cell 20*a* and a second metal air battery cell 20*b*, which are arranged adjacent to each other. An air outflow unit 121*b* of each of the two adjacent fluid tubes 121 may be positioned on opposite surfaces of the first and second metal air cells 20*a* and 20*b*.

In an exemplary embodiment, the first and second metal air cells 20*a* and 20*b* may be arranged to be symmetrical to each other. For example, an electrolyte film 12 and an metal anode layer 13 of the first metal air cell 20*a* may include a bend to surround a left side surface of a cathode layer 11 such that a right side surface of the cathode layer 11 is exposed to the outside. Alternatively, an electrolyte film 12 and a metal anode layer 13 of the second metal air cell 20*b* may be include a bend to surround a right side surface of a cathode layer 11 such that a left side surface of the cathode layer 11 is exposed to the outside. Therefore, the air inflow unit 121*a* shared by the two adjacent fluid tubes 121 may be positioned to face the right side surface of the cathode layer 11 in the first metal air cell 20*a* and the left side surface of the cathode layer 11 in the second metal air cell 20*b*.

It should be understood that exemplary embodiments described herein should be considered in a descriptive sense only and not for purposes of limitation. Descriptions of features or aspects within each exemplary embodiment should be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A metal air battery comprising:
a battery module comprising a metal air cell configured to use oxygen as a positive electrode active material;
an air channel unit comprising a fluid tube extending from a side of a cathode layer of the metal air cell to a side of a metal anode layer of the metal air cell; and
an air supply unit configured to supply air to the air channel unit,
wherein the fluid tube is configured to direct air from the side of the cathode layer of the metal air cell to the side of the metal anode layer of the metal air cell.

2. The metal air battery of claim 1,
wherein the battery module comprises a first metal air cell and a second metal air cell, which are adjacent to each other,
wherein the air channel unit comprises
a first fluid tube disposed on the first metal air cell, and
a second fluid tube disposed on the second metal air cell, and
wherein each of the first fluid tube and the second fluid tube comprises an air inflow unit configured for air inflow and an air outflow unit configured for air outflow.

3. The metal air battery of claim 2, wherein the air inflow unit of the first fluid tube and the air inflow unit of the second fluid tube are disposed between the first metal air cell and the second metal air cell.

4. The metal air battery of claim 3, wherein the first fluid tube and the second fluid tube share a single air inflow unit.

5. The metal air battery of claim 4, wherein the air outflow unit of the first fluid tube and the air outflow unit of the second fluid tube are disposed on opposite surfaces of the first metal air cell and the second metal air cell.

6. The metal air battery of claim 4, wherein an area of the air inflow unit shared by the first fluid tube and the second fluid tube is greater than an area of the air outflow unit of each of the first fluid tube and the second fluid tube.

7. The metal air battery of claim 2, wherein
the air inflow unit of the first fluid tube is disposed adjacent to the side of the cathode layer of the first metal air cell,
the air inflow unit of the second fluid tube is disposed adjacent to the side of the cathode layer of the second metal air cell,
the air outflow unit of the first fluid tube is disposed adjacent to the side of the metal anode layer of the first metal air cell, and
the second fluid tube is disposed adjacent to the side of the metal anode layer of the second metal air cell.

8. The metal air battery of claim 1, further comprising a manifold disposed between the air supply unit and the air channel unit, wherein the manifold is configured to uniformly distribute air from the air supply unit to the fluid tube.

9. The metal air battery of claim 1, further comprising a temperature sensor configured to measure an air temperature inside the fluid tube.

10. The metal air battery of claim 9, wherein the air supply unit comprises a temperature adjustment unit, and wherein the temperature adjustment unit is configured to adjust a temperature of the air supplied to the air channel unit.

11. The metal air battery of claim 10, further comprising a control unit configured to control the temperature adjustment unit based on the air temperature inside the fluid tube.

12. The metal air battery of claim 10, wherein the air supply unit further comprises
an air suction unit configured to suction air from outside of the air supply unit, and
a moisture removal unit configured to remove moisture from the suctioned air.

13. The metal air battery of claim 1, further comprising a heat exchange structure disposed on the side of the cathode layer or on the side of the metal anode layer of the metal air cell.

14. The metal air battery of claim 13, wherein the heat exchange structure comprises a concave-convex structure disposed on a surface of the cathode layer or on a surface of the metal anode layer of the metal air cell.

15. The metal air battery of claim 13, wherein the heat exchange structure comprises a plurality of flat plates which protrude in a perpendicular direction from the surface of the cathode layer or the surface of the metal anode layer.

16. The metal air battery of claim 1, wherein the metal air cell further comprises:
a metal anode layer;
an electrolyte film disposed on the anode metal layer; and
a cathode layer disposed on the electrolyte film and configured to use oxygen as an active material.

17. The metal air battery of claim 16,
wherein the fluid tube comprises
an air inflow unit configured for air inflow, and
an air outflow unit configured for air outflow, and
wherein the air inflow unit and the air outflow unit are disposed adjacent to the cathode layer and the metal anode layer of the metal air cell, respectively.

18. The metal air battery of claim 17, wherein the fluid tube comprises a plurality of the fluid tubes which are arranged with respect to a single metal air cell.

19. The metal air battery of claim 18, wherein the plurality of fluid tubes are disposed at regular intervals along surfaces of the metal anode layer and the cathode layer.

20. The metal air battery of claim 18, wherein a barrier layer is disposed between the plurality of fluid tubes.

21. The metal air battery of claim 1, wherein the metal air cell has a three dimensional structure comprising:
a cathode layer;
an electrolyte film, which comprises a bend and surrounds a lower surface, a first side surface, and an upper surface of the cathode layer; and
a metal anode layer, which comprises a bend and surrounds a lower surface, a first side surface, and an upper surface of the electrolyte film,
wherein the electrolyte film and the metal anode layer are disposed such that a second side surface of the cathode layer is exposed to an outside of the metal air cell, and
wherein the second side surface is opposite to the first side surface of the cathode layer.

22. The metal air battery of claim 21,
wherein the metal air cell comprises a plurality of cathode layers, and
wherein each electrolyte film and each anode metal layer comprises a bend and surrounds a corresponding cathode layer of the plurality of cathode layers.

23. The metal air battery of claim 21, wherein each fluid tube is disposed on a corresponding cathode layer of the plurality of cathode layers, respectively.

24. The metal air battery of claim 23, wherein each of the fluid tubes extends from the second side surface of each of the plurality of cathode layers to the metal anode layer to surround at least a portion of the metal air cell.

25. The metal air battery of claim 24,
wherein each of the fluid tubes comprises an air inflow unit configured for air inflow and an air outflow unit configured for air outflow,
wherein an inlet of the air inflow unit and an outlet of the air outflow unit of each of the fluid tubes face a third side surface of each of the plurality of cathode layers, and
wherein the third side surface is between the first side surface and the second side surface of each of the plurality of cathode layers.

26. The metal air battery of claim 25,
wherein a portion of each of the fluid tubes surrounds a fourth side surface of each of the plurality of cathode layers, and
wherein the fourth side surface is opposite to the third side surface of each of the plurality of cathode layers.

27. A method of controlling a temperature of the metal air battery of claim 1, the method comprising:
operating the battery module;
supplying air from the air supply unit to the air channel unit;
directing air through the fluid tube of the air channel unit from the side of the cathode layer of the metal air cell to the side of the metal anode layer of the metal air cell such that air flows across a surface of the cathode layer and across a surface of the anode layer, wherein the fluid tube comprises an air inflow unit through which the air flows into the air channel unit and an air outflow unit through which the air flows out of the air channel unit; and cooling the cathode layer and heating the metal anode layer simultaneously to control the temperature of the metal air battery.

\* \* \* \* \*